Aug. 22, 1967  L. PERAS  3,336,782
MANUFACTURE OF JAWS FOR UNIVERSAL JOINTS OR LIKE PARTS
Filed June 22, 1964
PRIOR ART Fig_2
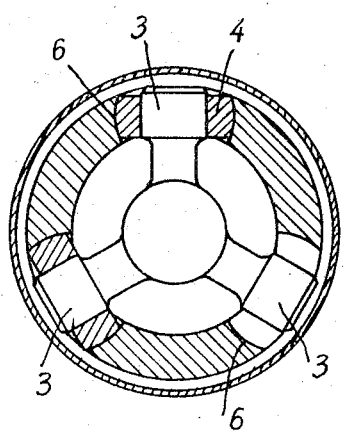
Fig_1 PRIOR ART
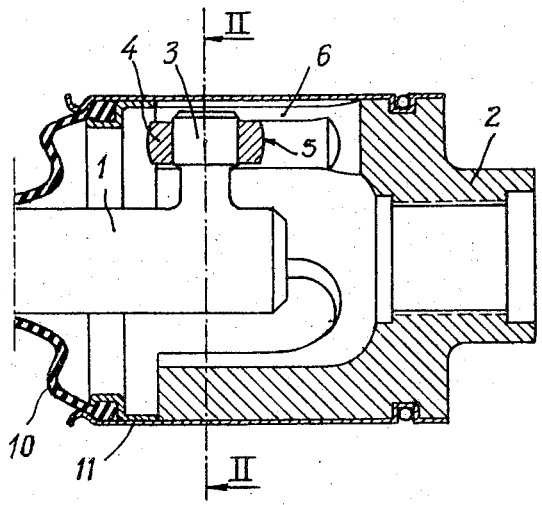
Fig_4
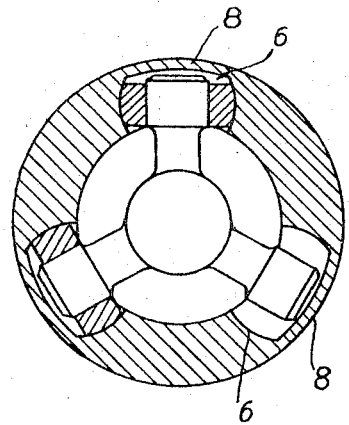
Fig_3
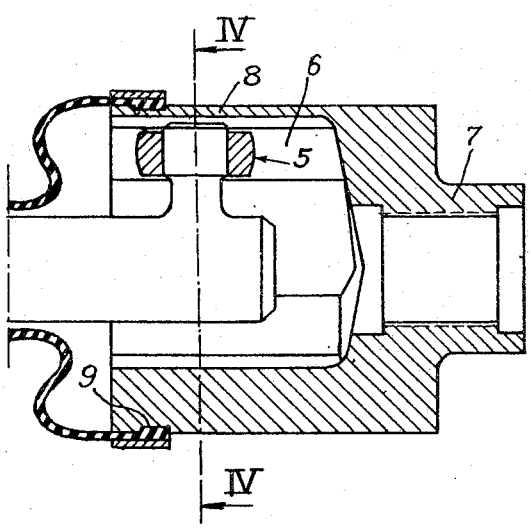
Inventor
Lucien Peras
By Stevens, Davis, Miller & Mosher
Attorneys

United States Patent Office 3,336,782
Patented Aug. 22, 1967

3,336,782
MANUFACTURE OF JAWS FOR UNIVERSAL JOINTS OR LIKE PARTS
Lucien Peras, Billancourt, France, assignor to Regie Nationale des Usines Renault, Billancourt, France
Filed June 22, 1964, Ser. No. 376,857
Claims priority, application France, July 12, 1963, 941,331, Patent 1,370,198; Nov. 9, 1963, 953,278, Patent 86,256
8 Claims. (Cl. 72—256)

The present invention relates to the manufacture of jaws for universal joints or like components.

Universal joints are known which are essentially composed of two elements, one forming a star with three arms (or with any number of arms) carried by a shaft, the other element being a female part or jaw carried by the opposite shaft.

Each arm of the first element comprises a pivot on which can rotate or slide a spherical member. The jaw comprises as many grooves as there are arms in the first element, the flanks of these grooves being cylindrical surfaces which form rolling and sliding tracks for the spherical members.

In the usual way, in order to facilitate machining of the grooves, the latter open out on to the exterior periphery of the jaw, which has thus the shape of a tulip with separated female arms.

This arrangement has the following two disadvantages:
The machining of the grooves is expensive;
The arms of the jaw constitute a kind of tuning fork which is brought into resonance at certain speeds, thus forming a source of noise and adversely affecting the behavior of the joint in service.

In order to overcome these drawbacks, it has been proposed to produce jaws in which the arms are no longer separate but remain coupled to each other by an outer wall, thereby preventing any vibration.

The present invention is directed to the manufacture of jaws of this kind or like parts in the form of a tulip, comprising cylindrical parallel cavities directed along the axis of the piece, and formed in the thickness of the wall and opening into one side only of the said wall. This wall must comply with certain requirements of dimensional precision and surface condition, and the manufacture is effected by deformation without removal of material, the last operation, which may be the only one, being carried out at a temperature which is sufficiently low to ensure the observance of the tolerances on dimensions and surface condition.

The invention will be more readily understood, and its advantages will be more clearly apparent from the description which follows below with reference to the accompanying drawings, in which there has been shown by way of example and without limitation, one form of construction of a joint with three arms. In these drawings:

FIGURE 1 is a diagrammatic view in longitudinal section of a known joint comprising a jaw of the usual type;

FIGURE 2 is a transverse section taken along the line II—II of FIGURE 1;

FIGURE 3 is a diagrammatic view in longitudinal section of a joint comprising a jaw in accordance with the invention;

FIGURE 4 is a transverse section taken along the line IV—IV of FIGURE 3.

FIGURES 1 and 2 show a form of construction of a joint of the usual kind previously referred to. There can be seen at 1 and 2 the two elements of the joint rigidly fixed to the shafts which are to be coupled together.

The element 1 comprises three pivots 3 of cylindrical shape, on which can rotate and slide the parts 4, the outer surface of which is a portion of a sphere 5.

The element 2 known as a jaw, of hollow cylindrical shape, fits over the head of the element 1 and comprises three grooves 6; the flanks of each of these grooves are cylindrical surfaces, the radius of which is the same as that of the portions of sphere 5, and the center of which is located on the corresponding pivot axis, these surfaces forming a rolling and sliding track for the parts 4.

As can be seen from FIGURE 2, the grooves 6 open out on the outer periphery of the piece 2. This arrangement makes it possible to carry out the machining of the grooves with ease, but, apart from the fact that this machining is itself costly, it can be seen that the three arms of the jaw, thus completely separated and subjected to variable forces, may come into resonance at certain speeds of rotation of the joint. These vibrations are a source of noise and can result in premature wear of the parts of the joint.

These disadvantages are overcome by utilizing a jaw 7 which has the form shown in FIGURES 3 and 4, in which the grooves 6 no longer open out on to the exterior.

By way of indication, the thickness of the wall 8 on a level with the grooves is from 3 to 5 mm. for an external diameter of 70 to 80 mm.

According to the invention, the jaw 7 is produced by deformation of material, comprising at least one final operation at a moderate temperature, in order to ensure observance of the tolerances of dimensions and surface condition.

According to a first method of operation, the jaw 7 is produced by hot extrusion and cold drawing, which dispenses with all machining of the grooves and results in a substantial economy (it is eventually possible to improve the surface condition of the grooves by a light rubbing with a stone).

Similarly, the external diameter can be left in the condition as drawn, only the circular groove 9 necessary for the fixing of the sealing bellows 10 requiring to be machined. It should be observed that an economy is also effected in respect of the sheet steel cover 11 (see FIGURE 1) which is no longer necessary.

The jaw 7 may be made either of steel with a high carbon content (0.4 to 0.6%) in order to permit the hardening of the grooves 6 by high-frequency treatment, or of case-hardened steel.

This treatment by hot extrusion and cold drawing is mainly effective in the case where steels with a high carbon content are employed. The cold drawing has the purpose of correcting the imperfections of the surface resulting from the hot extrusion operation, of ensuring the dimensional accuracy of the cylindrical portions constituting the rolling tracks for the rollers and of ensuring a suitable surface condition.

The operation may also be effected by direct extrusion in the cold state, followed or not by a cold drawing operation, in the case where case-hardening steels are employed.

By virtue of these operations, the rolling tracks have the advantage of a precision higher than that obtained by the current machining methods and a surface condition having a mean quadratic roughness substantially less than 5 microns.

Finally, the manufacture may be preceded by the preparation of a rough model having a form approximating to that of the finished part, by pouring spheroidal graphite cast-iron, or malleable perlitic cast-iron, followed by drawing at an average temperature in order to obtain also the suitable surface condition and to ensure the dimensional accuracy of the cylindrical portions constituting the rolling tracks of the rollers.

The hardening of the portions subjected to the action of the rollers is obtained by tempering after heating by induction at high or medium frequency in the case of carbon steels, the spheroidal graphite cast-iron and the malleable cast-iron, and by tempering after case-hardening in the case of special case-hardening steels.

As has already been stated, the method of operation according to the invention can be applied to parts of similar shapes, other than jaws of joints.

I claim:

1. A method of manufacture of hollow parts of tulip shape having grooves formed in the thickness of the wall and debouching on only one side of said wall, such as female members of universal joints having jaws formed with grooves therein intended to constitute travel paths for part-spherical headed pivots borne by a male member of said joint, said method comprising the steps of extruding a rough blank, drawing said blank to within suitable dimensions, and further deforming said blank, without removal of material therefrom, at a temperature sufficiently low enough to assure compliance with the tolerances as to dimensions and condition of the surface of said blank.

2. A method according to claim 1, in which said blank is formed by selective casting of spheroidal graphite cast-iron and perlitic malleable cast-iron.

3. A method according to claim 1, in which said part is hardened by tempering after case-hardening.

4. A method according to claim 1, in which said part is hardened by induction heating.

5. A method according to claim 1, in which the final step is cold drawing.

6. A method according to claim 1, in which the final step comprises hot extrusion followed by cold drawing.

7. A method according to claim 1, in which the final step comprises cold extrusion followed by cold drawing.

8. A method according to claim 1, in which the final step is a direct cold extrusion.

References Cited

UNITED STATES PATENTS

| | | | |
|---|---|---|---|
| 545,067 | 8/1895 | Friedrich et al. | 72—276 |
| 1,171,344 | 2/1916 | Legere | 72—260 |
| 1,819,254 | 8/1931 | Mantle | 72—260 |

CHARLES W. LANHAM, *Primary Examiner.*

H. D. HOINKES, *Assistant Examiner.*